(12) United States Patent
Baker

(10) Patent No.: US 6,843,365 B2
(45) Date of Patent: Jan. 18, 2005

(54) NARROW BELT CONVEYOR SYSTEM

(75) Inventor: Timothy R. Baker, Muskegon, MI (US)

(73) Assignee: Paragon Technologies, Inc., Easton, PA (US)

( * ) Notice: Subject to any disclaimer, the term of this patent is extended or adjusted under 35 U.S.C. 154(b) by 0 days.

(21) Appl. No.: 10/796,764

(22) Filed: Mar. 9, 2004

(65) Prior Publication Data

US 2004/0173436 A1 Sep. 9, 2004

Related U.S. Application Data

(62) Division of application No. 10/072,411, filed on Feb. 8, 2002, now abandoned.
(60) Provisional application No. 60/267,864, filed on Feb. 9, 2001.

(51) Int. Cl.[7] .............................................. B65G 23/44
(52) U.S. Cl. ...................... 198/813; 198/814; 198/817
(58) Field of Search ............................... 198/813, 814, 198/817; 474/135

(56) References Cited

U.S. PATENT DOCUMENTS

| | | | |
|---|---|---|---|
| 1,168,865 A | | 1/1916 | Drake |
| 3,088,581 A | * | 5/1963 | Rostal ........................ 198/817 |
| 3,456,773 A | | 7/1969 | Titmas |
| 3,470,668 A | * | 10/1969 | Lindstrom et al. .......... 198/817 |
| 3,942,624 A | * | 3/1976 | Kupcikevicius ............. 198/817 |
| 4,249,661 A | | 2/1981 | Lem |
| 4,269,305 A | | 5/1981 | Fryatt |
| 4,511,030 A | | 4/1985 | Lem |
| 4,696,386 A | | 9/1987 | Lem |
| 4,730,718 A | | 3/1988 | Fazio et al. |
| 4,926,999 A | | 5/1990 | Fauth, Sr. et al. |
| 4,930,623 A | | 6/1990 | Johnson et al. |
| 4,962,841 A | | 10/1990 | Kloosterhouse |
| 5,042,644 A | | 8/1991 | Davis |
| 5,092,451 A | | 3/1992 | Jones et al. |
| 5,165,516 A | | 11/1992 | Reed et al. |
| 5,180,504 A | | 1/1993 | Johnson et al. |
| 5,205,394 A | | 4/1993 | Zeuschner |
| 5,311,983 A | | 5/1994 | Clopton |
| 5,316,134 A | | 5/1994 | Donohue |
| 5,329,800 A | * | 7/1994 | Herdzina et al. ........... 198/814 |
| 5,427,223 A | | 6/1995 | Van Den Goor |
| 5,435,429 A | | 7/1995 | Van Den Goor |
| 5,590,995 A | | 1/1997 | Berkers et al. |
| 5,641,056 A | | 6/1997 | Lem |
| 5,657,858 A | | 8/1997 | Van Den Goor |
| 5,667,054 A | | 9/1997 | Van Den Goor |
| 5,676,237 A | | 10/1997 | Lem |
| 5,695,042 A | | 12/1997 | Van Der Burgt et al. |

(List continued on next page.)

FOREIGN PATENT DOCUMENTS

| | | |
|---|---|---|
| EP | 0 310 411 B1 | 4/1989 |
| GB | 2 187 156 A | 9/1987 |
| GB | 2 210 841 A | 6/1989 |
| WO | WO 94/18101 A1 | 8/1994 |

OTHER PUBLICATIONS

International Search Report fo PCT/US02/203535.

*Primary Examiner*—Joseph Valenza
(74) *Attorney, Agent, or Firm*—Cook, Alex, McFarron, Manzo, Cummings & Mehler, Ltd.

(57) ABSTRACT

A narrow belt conveyor system including a plurality of narrow, continuous, spaced-apart belts adapted to receive an accessory such as a sorter, accumulator, diverter, and/or transfer between the belts. The conveyor system includes a pair of side frame members, each with an elongated track that slidingly receives the accessory so that it can be readily moved to selected locations along the length of the conveyor. A belt tensioning mechanism provides for independent tensioning of the conveyor belts. A belt guide track with a low friction insert supports the loaded belt, while the guide rollers engage the edges of the belts along their return runs.

4 Claims, 12 Drawing Sheets

U.S. PATENT DOCUMENTS

| | | |
|---|---|---|
| 5,826,695 A | 10/1998 | Van Den Goor |
| 5,826,704 A | 10/1998 | Van Den Goor |
| 5,839,570 A | 11/1998 | Vertogen et al. |
| 5,909,797 A | 6/1999 | Van Den Goor |
| 5,944,171 A | 8/1999 | Vertogen et al. |
| 5,984,498 A | 11/1999 | Lem et al. |
| 6,012,568 A | 1/2000 | Kane |
| 6,035,998 A | 3/2000 | Garzelloni |
| 6,085,892 A | 7/2000 | Lem et al. |
| 6,105,751 A | 8/2000 | Jentijens et al. |
| 6,359,247 B1 | 3/2002 | Lem et al. |
| 6,378,687 B1 | 4/2002 | Lem et al. |
| 6,427,831 B1 | 8/2002 | Norton |
| 6,466,828 B1 | 10/2002 | Lem et al. |
| 6,619,465 B1 | 9/2003 | Gebhardt |

* cited by examiner

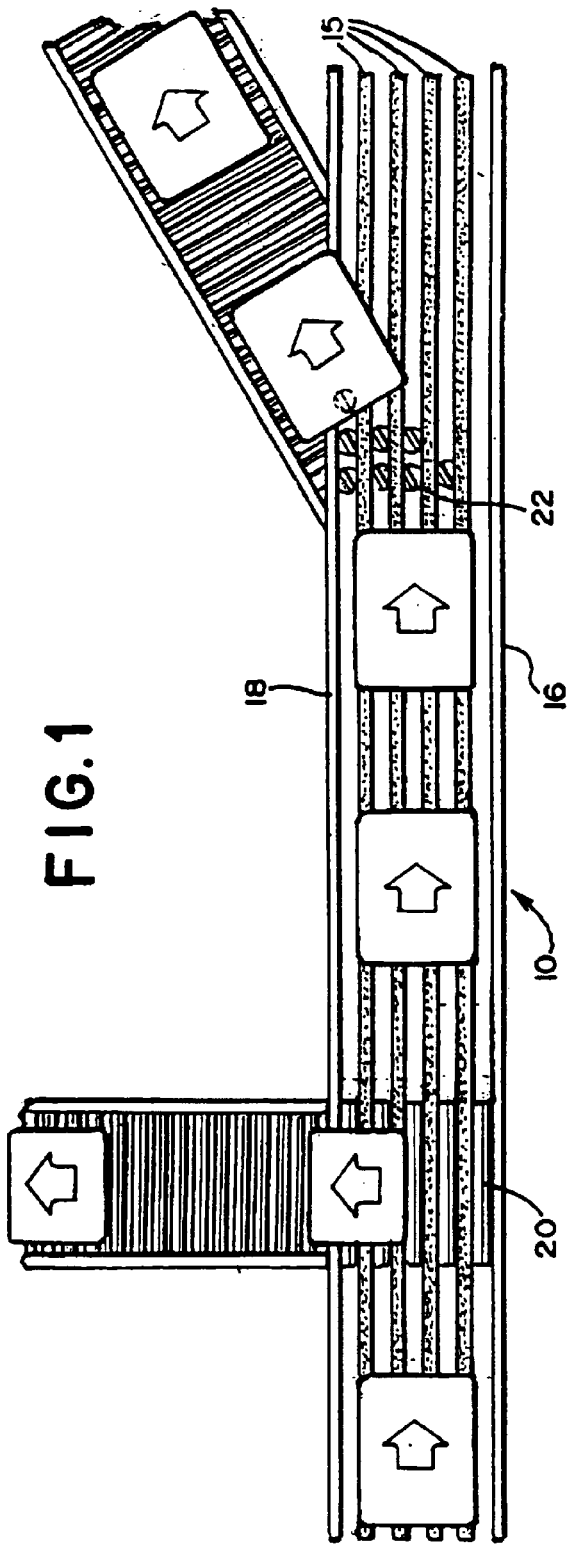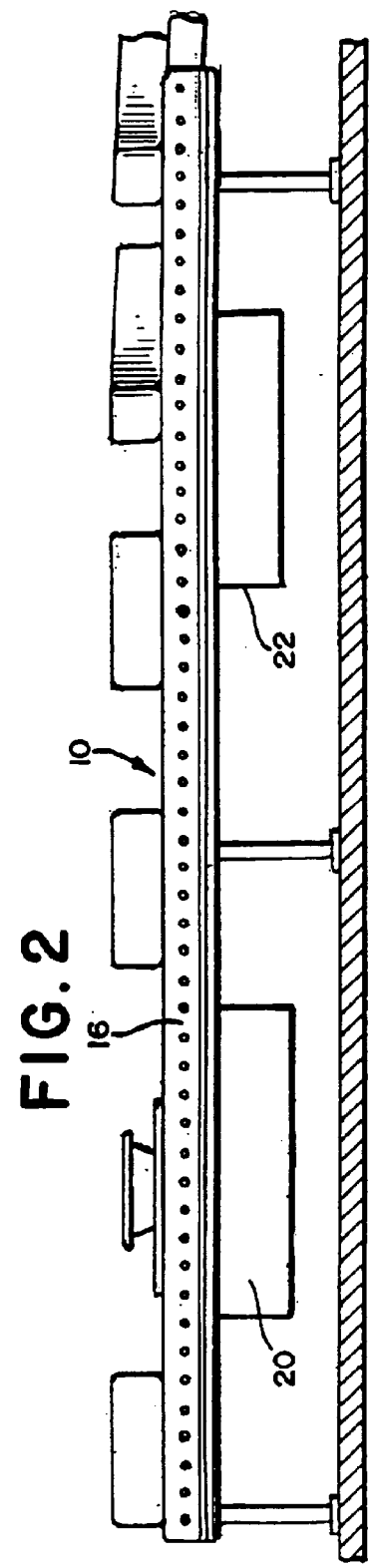

NARROW BELT CONVEYOR SYSTEM

CROSS REFERENCE TO RELATED APPLICATION

This is a division of application Ser. No. 10/072,411, filed Feb. 8, 2002 now abandoned.

This application claims the benefit of the filing date of provisional application Ser. No. 60/267,864, filed Feb. 9, 2001.

BACKGROUND OF THE INVENTION

The present invention relates to a material handling system and, more particularly, to a narrow belt conveyor system.

Narrow belt conveyor systems use multiple, continuously moving parallel belts for conveying flat-bottomed objects along straight runs. Narrow belt conveyor systems are often used in conjunction with accessories, such as sorters, transfers, accumulators and/or diverters, which are located between the several belts of the conveyor intermediate the ends thereof, to, e.g., change the direction of conveyed items, etc. Such sorters, accumulators, transfers, and diverters, which may be, e.g., powered rollers or wheels, are moved from a retracted position that is beneath the top surface of the conveyor belts, to an extended position above the top surface so that they can engage the underside of the conveyed items to effect a change of direction.

Narrow belt conveyors are popular because of their versatility. In particular, they are susceptible to modification in the placement of the sorters, accumulators, transfers, and/or diverters to suit the changing needs of the users.

However, such narrow belt conveyors also have limitations. For example, the movement of the sorters, accumulators, transfers, and/or diverters can often be time consuming and labor intensive. In addition, the narrow belts must also track accurately in order to avoid interference with the various sorters, accumulators, transfers, and/or diverters that have to fit therebetween. As can be readily appreciated, any structure that provides for tracking must also not promote any undue wear of the belts. Further, proper tensioning of the belts is needed to make sure that each of the belts are driven at the same speed. This has also proven difficult, particularly if the several belts vary in length due to, for example, unequal stretching of the belts over their service lives.

Accordingly, it is an object of the present invention to provide an improved narrow belt conveyor system.

More particularly, it is an object to provide such a narrow belt conveyor system that facilitates the easy relocation of accessories such as transfers, accumulators, sorters, and/or diverters along the length of the conveyor.

It is another object to provide such a conveyor system that has improved belt tracking while not promoting undue belt wear.

It is also an object of the present invention to provide a belt tensioning apparatus for a narrow belt conveyor system which tensions the several belts equally.

SUMMARY OF THE INVENTION

These objects, as well as others which will become apparent upon reference to the accompanying drawings and following detailed description, are provided by a narrow belt conveyor system in which the belts are supported between a pair of opposed, elongated side frame members that extend between the drive end and the return end of the conveyor system. An elongated track is associated and generally co-extensive with each side frame member, with each elongated track being adapted to slidingly receive a mounting member of an accessory, such as a sorter, accumulator, transfer, and/or diverter, so that the accessory can be moved along the track to the desired location intermediate drive end and the return end. In a preferred embodiment, the elongated track is generally U-shaped so as to form a channel adapted to receive a slide plate, the slide plate being mounted to the accessory. The side frames may also be provided with a plurality of opposed, spaced-apart mounting holes for mounting external conveyor accessories such as conveyor spurs, photo-eye brackets, and scanners.

The conveyor may also be provided with a belt guide track for each belt comprising an elongated base member which is secured to the frame of the conveyor, and an elongated insert adapted to be carried on the base member. The base member is made of a low friction material and has opposed side walls to prevent the belt from moving laterally with respect to the support.

Additionally, a belt guide may be provided for the return run of each belt which comprises pairs of first and second freely-rotating rollers secured to the conveyor system on the opposite sides of each belt so that the rollers engage the edges of the belt. In a preferred embodiment, the rollers may include a channel adapted to receive the edge of the belt. Further, each roller in the pair may be longitudinally spaced from the other along the length of the belt.

Further, a belt tensioner is provided that includes an axle member which is mounted to the conveyor system transversely to the belts. A bracket assembly is provided for each belt that is pivotally mounted to the axle. Each bracket assembly includes a tensioning pulley that is mounted with respect to the bracket. A second bracket assembly is provided that is pivotally mounted to the axle member. An actuator is connected to this second bracket member for pivoting the second bracket assembly about the axle member. Each first bracket assembly is connected to the second bracket assembly by a lost motion connector comprising at least one resilient member. Thus, when the second bracket assembly is pivoted in the direction to apply tension to the belts, each bracket is tensioned individually to approximately the same tension.

BRIEF DESCRIPTION OF THE DRAWINGS

FIG. 1 is a fragmentary top view of a portion of a narrow belt conveyor system according to the present invention.

FIG. 2 is a side view of the narrow belt conveyor of FIG. 1.

DETAILED DESCRIPTION

Figure 7:
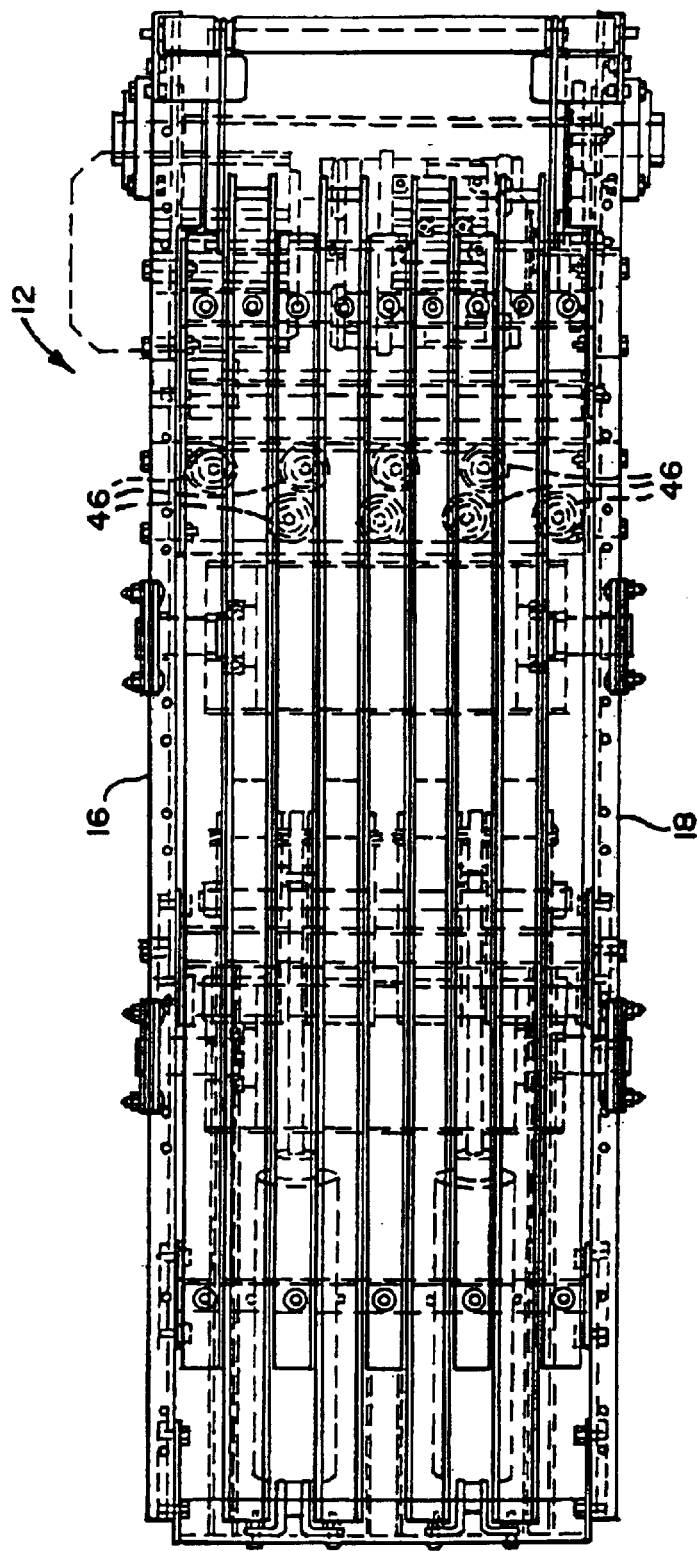
FIG. 7 is a top view of the drive end unit for use in connection with the present invention.
Figure 8:
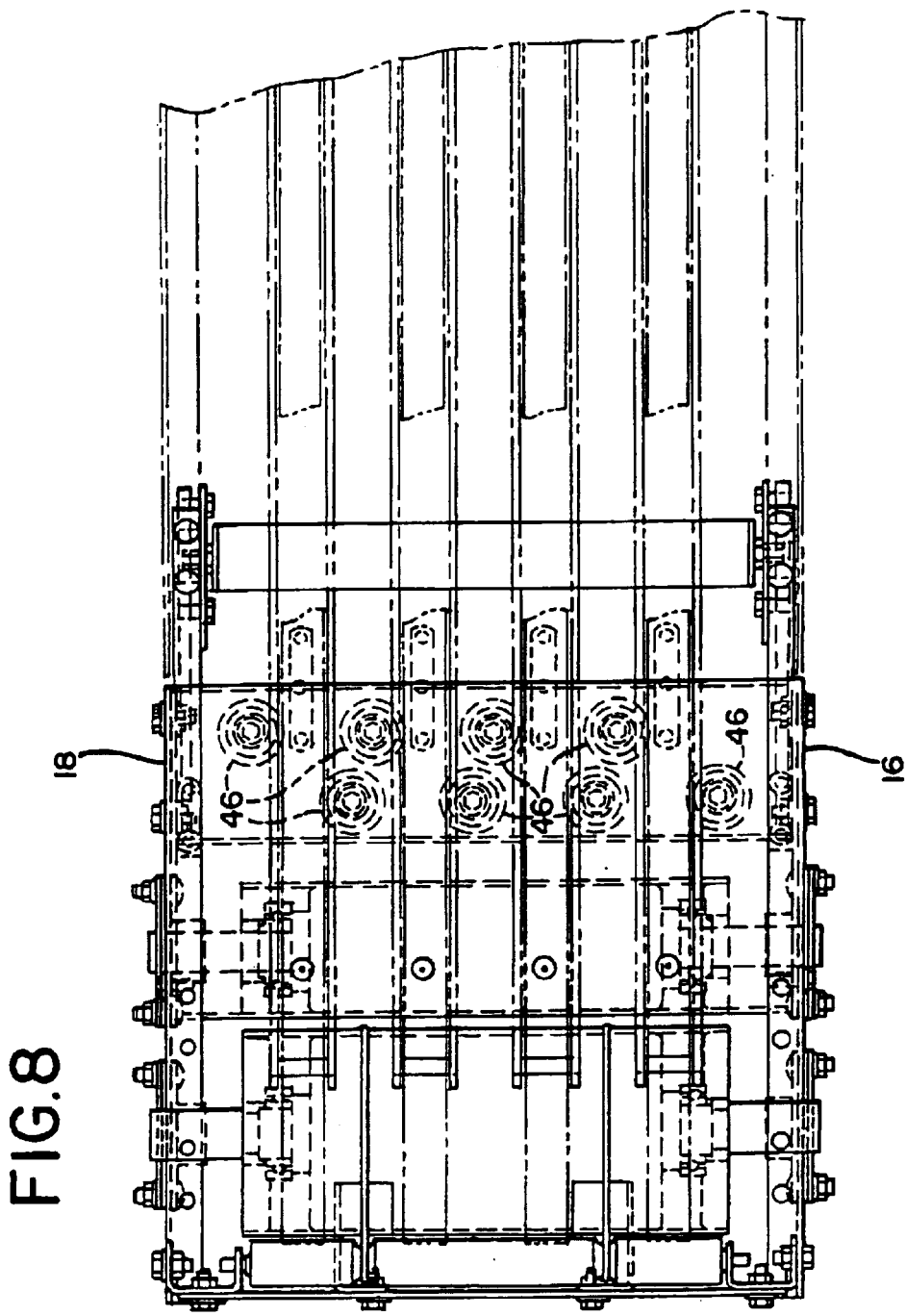
FIG. 8 is a top view of a return end unit for use in the present invention.
Figure 9:
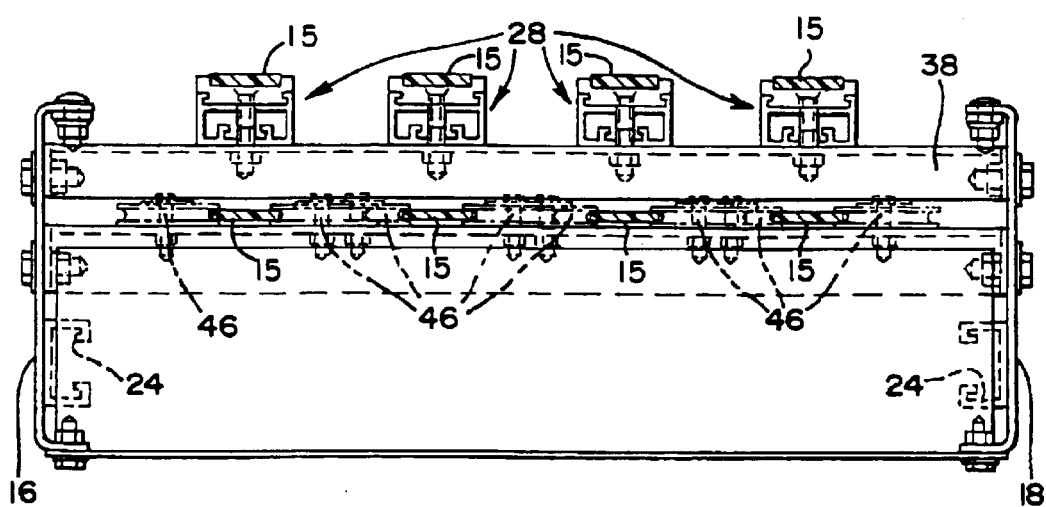
FIG. 9 is a cross-sectional view of the belt guide tracks and belt guide rollers for use in conjunction with the present invention.
Figure 11:
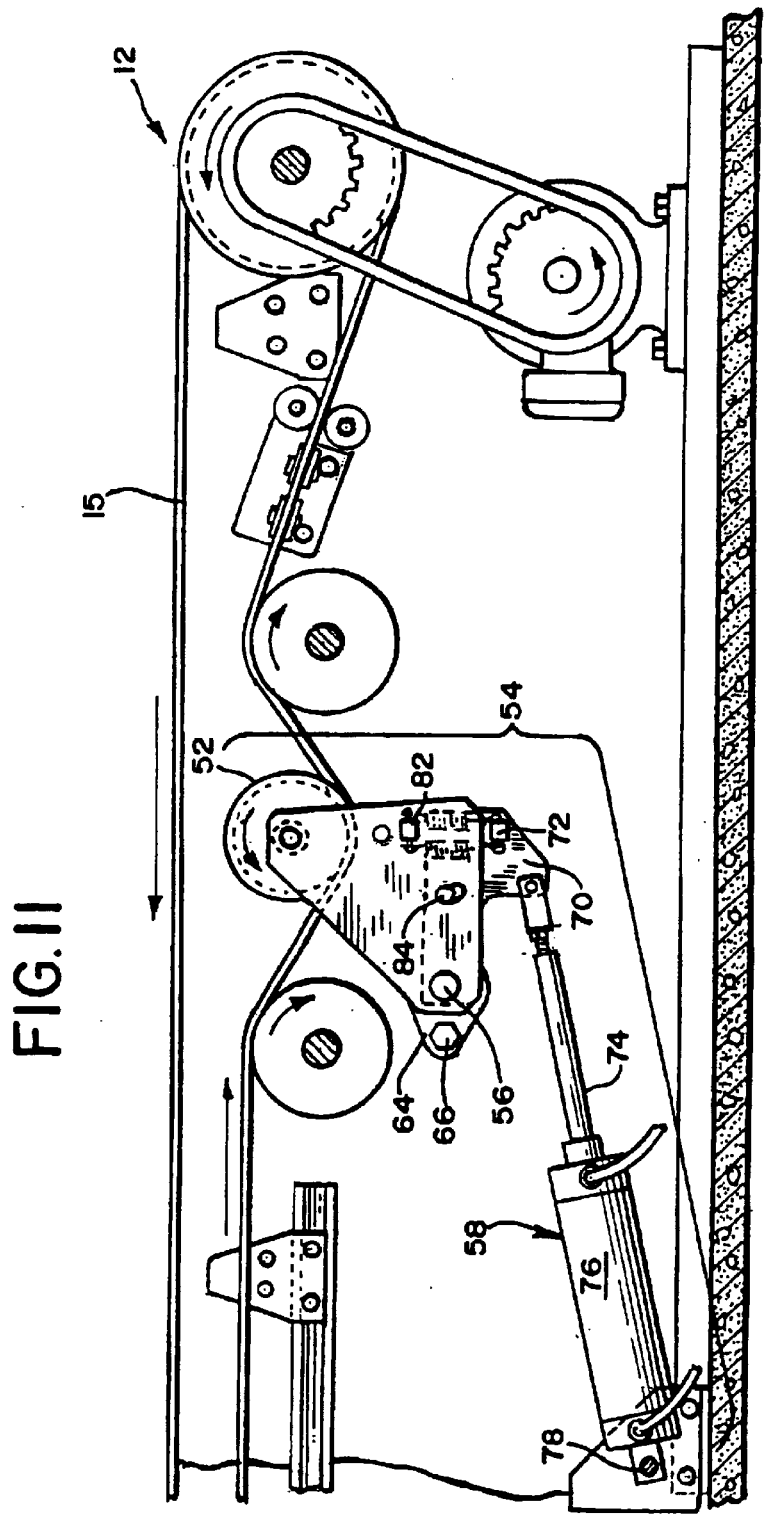
FIG. 11 is a fragmentary side view of the drive end unit showing the belt tensioner mechanism.

The conveyor system of the present invention can be made in practically any desired configuration by combining straight run units 10 (FIGS. 1, 2), drive end units 12 (FIGS. 7, 11), and return end units 14 (FIG. 8) in various combinations with sorters, accumulators, diverters and transfers, as dictated by the needs of the user. In the illustrated embodiment, the drive end unit is approximately 5 feet in length; each straight run unit is approximately 10 feet in length; and the return end unit is approximately 1½ feet in length. The illustrated narrow belt unit includes four belts 15, each no wider than approximately 2 inches wide. It will be appreciated, however, that the lengths of these individual units and belt widths can be varied and that more or fewer belts could be employed, depending on the needs of the user.

Figure 3:
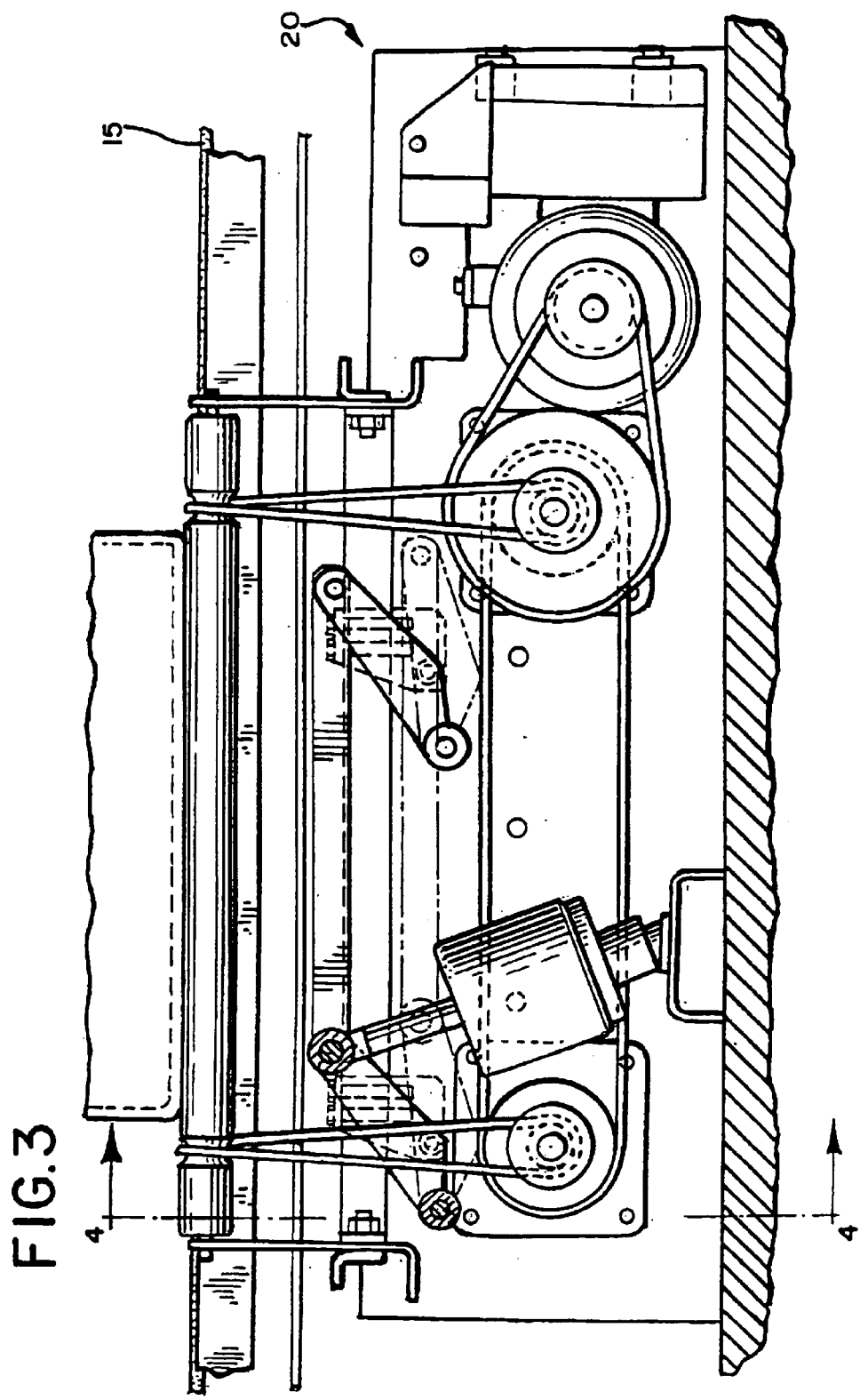
FIG. 3 is an enlarged side view of a 90° transfer unit for use in conjunction with the present invention and shown attached to the straight run unit of FIG. 2.
Figure 4:
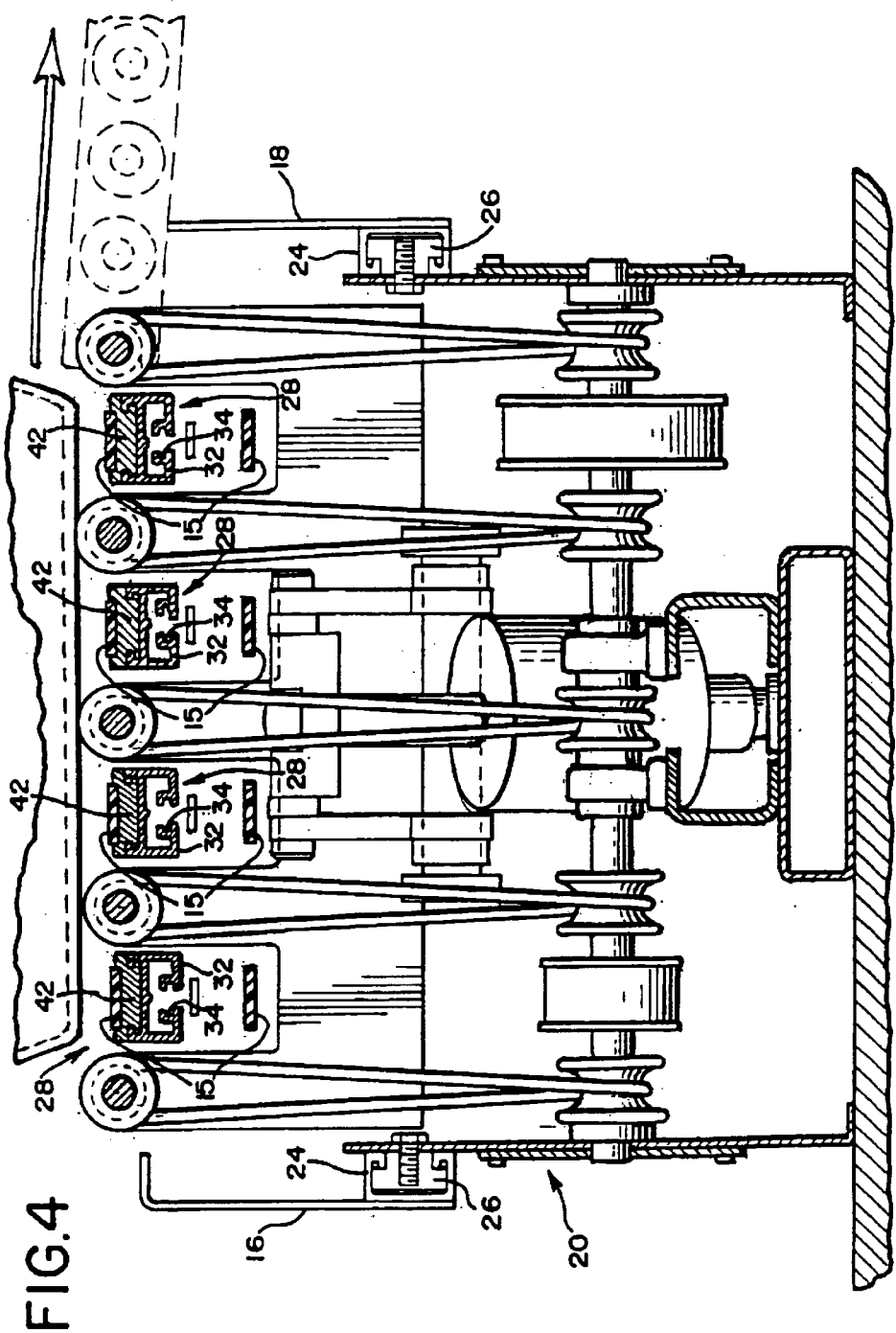
FIG. 4 is an end view of the 90° transfer unit of FIG. 3.
Figure 5:
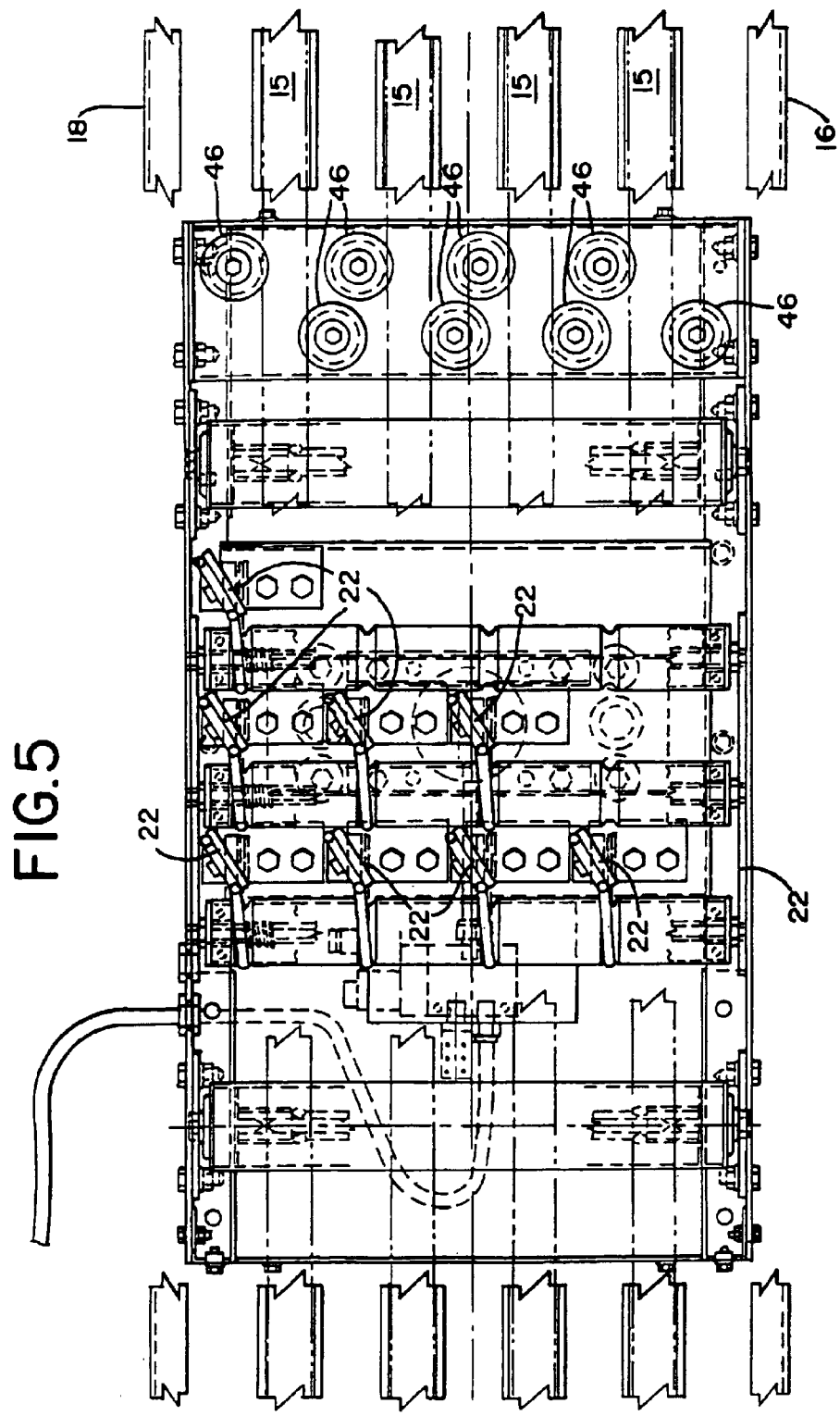
FIG. 5 is a top view of a 30° diverter also shown in conjunction with the narrow belt conveyor of FIG. 1.
Figure 6:
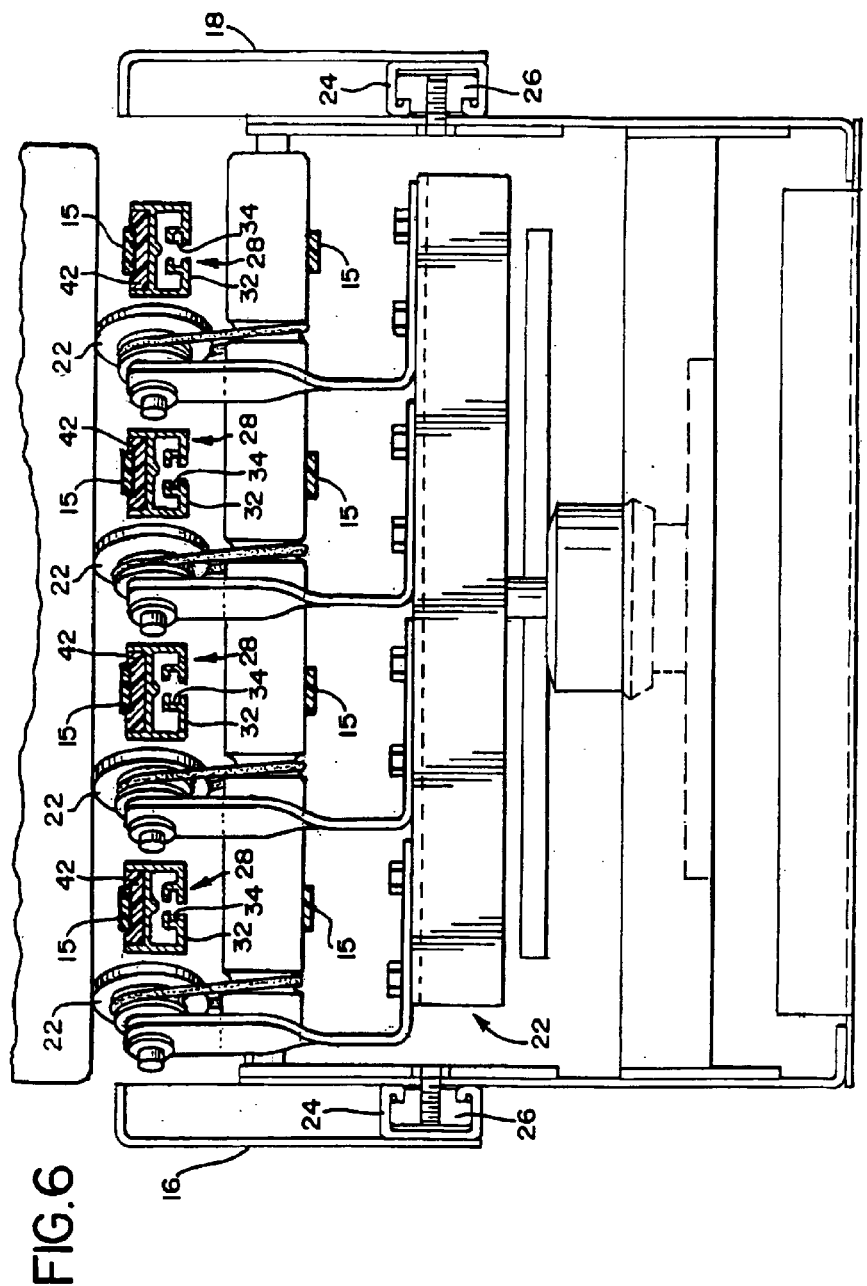
FIG. 6 is an end view of the 30° diverter of FIG. 5.

Each of these units includes opposed side frame members 16, 18 that interconnect and support the various components in the unit, such as 90° transfer 20 (FIGS. 3, 4) and 30° diverter 22 (FIGS. 5, 6). These transfers 20 and diverters 22 are well known and are not discussed in detail.

In keeping with one aspect of the present invention, the side frames 16, 18 have an elongated U-shaped track or channel 24 (best seen in FIGS. 2, 4, 6, 9) along their lengths that receive a mating portion 26 on the accessory to be supported between an opposed pair of side frames. Preferably, the mating portion 26 comprises a slide plate (FIG. 4). This allows for the accessory to be located in a variety of locations along the length of the side frame by merely sliding it along the channels. This is particularly advantageous in locating pop-up diverters 22 and transfers 20. Rather than the conveyor system being designed and assembled so that such pop-up diverters 22 and transfers 20 may be received in only one pre-determined location, the user has the flexibility of moving the diverter 22/transfer 20 anywhere along the length of the channel 24 in order to satisfy changing needs. Once the diverter 22 or transfer 20 is in the desired location, it can be secured to the side frames 16, 18 by tightening the bolt in the slide plates 26, thus locking the diverter 22 or transfer 20 to the channel. Importantly, should a different configuration for the conveyor system be desired, the diverter 22 or transfer 20 can be easily moved by loosening the bolts in the slide plates and sliding the accessory on the track to another location along the length of the unit or removing it altogether.

Each side frame 16, 18 also includes a plurality of mounting holes spaced at uniform intervals to facilitate mounting external conveyor accessories, such as conveyor spurs, photo-eye brackets, and scanners thereto.

Figure 16A:
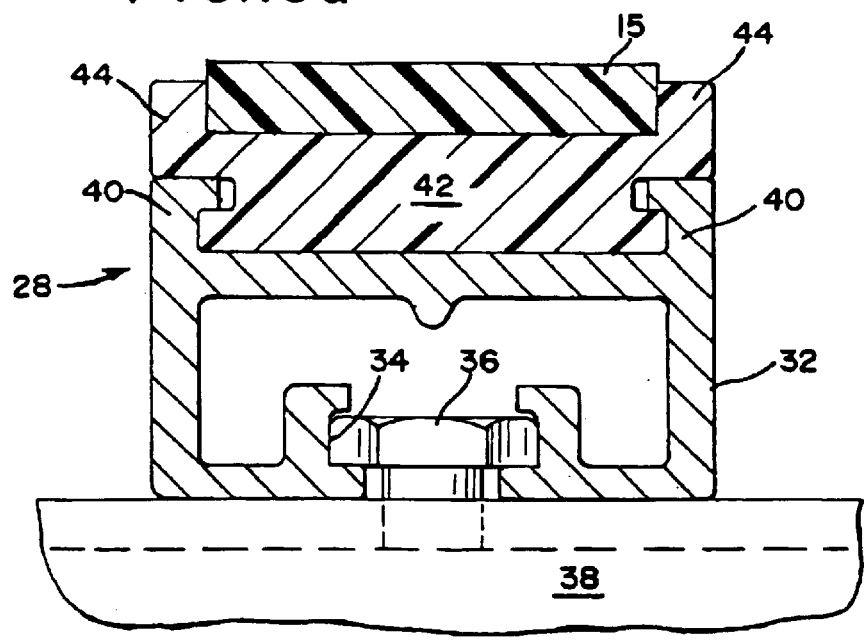
FIGS. 16a and 16b are enlarged cross-sectional views of two embodiments of the belt guide track.
Figure 16B:
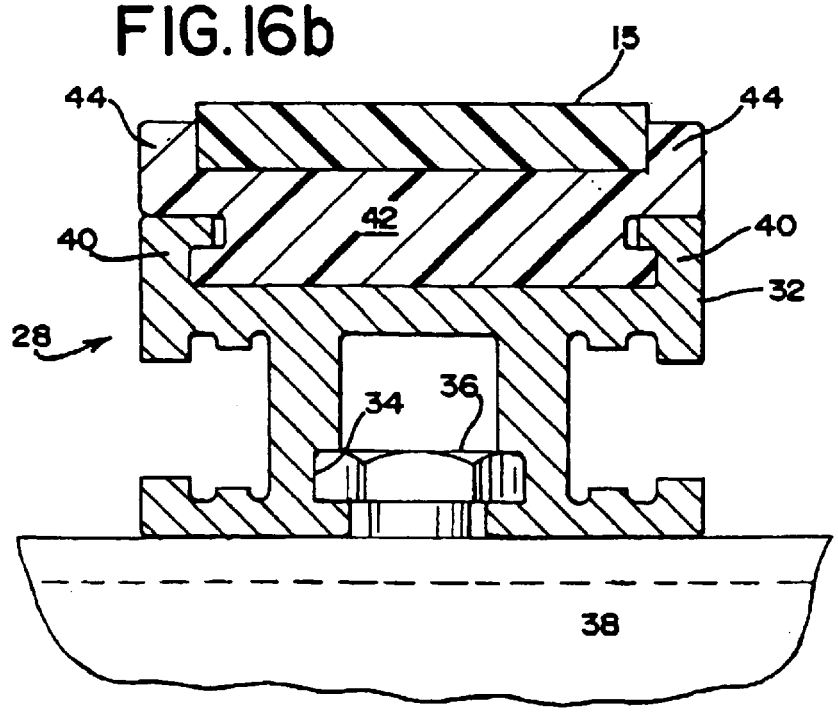

In keeping with another aspect of the present invention, an improved belt guide track 28 (FIGS. 4, 9, 12, 14, 16a, 16b) is provided that extends substantially the entire length of the top of the narrow belt sorter. The guide track fully supports the loaded belt 15 and provides for reduced wear on the belt 15. With reference to the drawings, the track is made of an elongated extruded aluminum base member 32 having a slot 34 on the lower side that is adapted to receive the head of a bolt 36, the bolt 36 being used to secure the track 28 to a cross member 38 carried by the side frames 16, 18. The upper side of the aluminum base includes two opposed side walls 40 (best seen in FIGS. 16a, 16b) that serve to locate and seat a complementary-shaped elongated plastic insert 42, preferably made of a suitable ultra high molecular weight (UHMW) plastic. If desired, the plastic insert can be secured to the rails by a tongue-and-groove fitting between the plastic insert and base or dovetail. This insert 42 provides a low-friction surface on which the belt is supported, thus reducing wear. The insert 42 also includes upwardly projecting side walls 44 (again, best seen in FIGS. 16a, 16b) that prevent the belt member from sliding laterally off the track, thus promoting accurate tracking of the belts.

While the track 28 described above guides and supports the loaded belt 15 on the exposed or top side of the sorter, on the return side, or under-side of the belt generally only directional guidance is needed, as no vertical load is supported by the belts.

Figure 10:
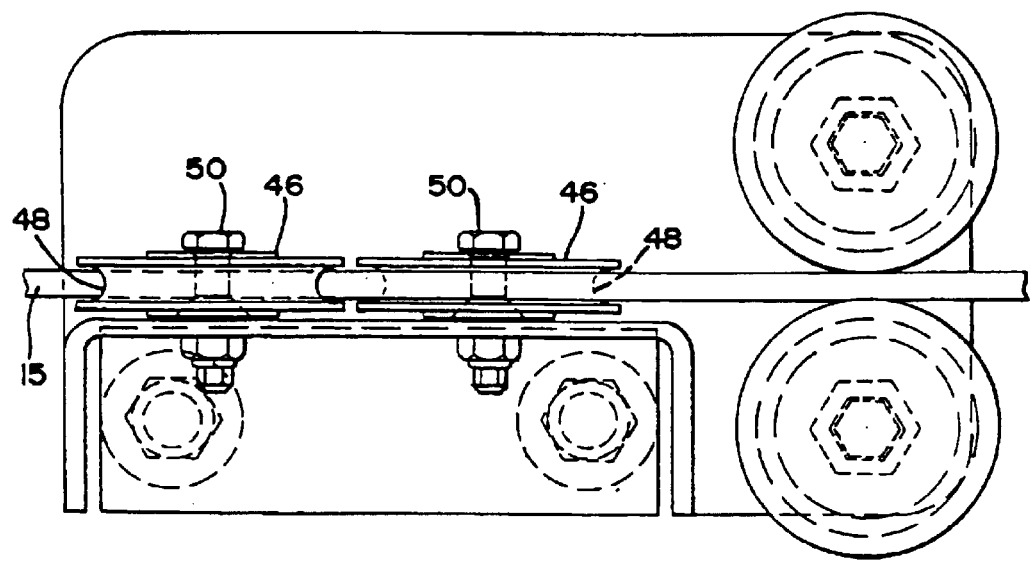
FIG. 10 is an enlarged view of a pair of belt guide rollers.

Accordingly, in keeping with a further aspect of the present invention, pairs of freely-rotating side rollers 46 (best seen in FIG. 10) are employed that include a U-shaped channel 48 that receives the edge of the belt 15. Each roller 46 is mounted to the conveyor support frame by a bolt 58. A pair of rollers 46 is provided at various locations along the length of the belt 15, each pair being located on opposite sides of the belt in a slightly staggered relationship so as to engage the opposed lateral edges thereof.

Belt tensioners are used in conveyor systems to insure that there is sufficient tension on the belt so that it does not slip when being engaged by the drive pulley. Belt tensioning is complicated in a narrow belt conveyor because slight variations in the lengths of the different belts can result in different tensions on the individual belts during the operation of the conveyor.

Accordingly, in a further aspect of the present invention (best seen in FIGS. 11–15), a plurality of freely-rotating tensioning sheaves or pulleys 52 are provided, one for each belt 15, with each pulley 52 being part of an assembly 54 that is pivotally mounted for rotation about a common axis 56. Each tensioning assembly 54 is mounted independently to the common axis 56 and is operatively connected to a pneumatic drive 58 comprising two pistons, with the pistons rotating the pulley assemblies 54 about the axis 56 to place tension on the belts 15 that are trained about the pulleys 52.

Figure 14:
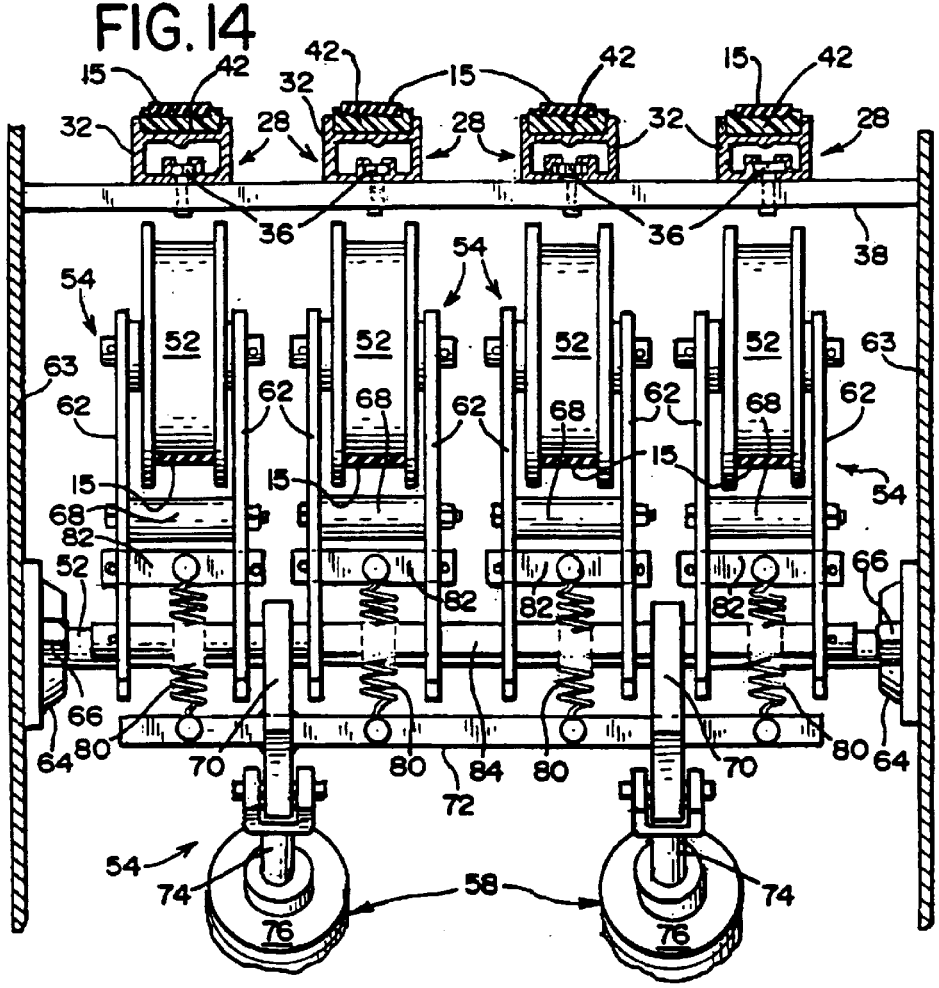
FIG. 14 is an end view of the drive end unit taken along lines 14—14 of FIG. 12 and showing the belt tensioning unit.

Each belt 15 has its own tensioning sheave or pulley 52 (as best seen in FIG. 14), with each pulley being supported between a pair of generally triangularly-shaped plates 62 to form a tensioning pulley assembly 54. The tensioning pulley 52 of each assembly 54 is supported adjacent one end of the hypotenuse of the triangle and the opposite end of the hypotenuse is supported for rotational movement about a cylindrical bar that forms the common axis 56 that is carried between the opposing side frame members 63 by brackets 64. The brackets 64 are secured to their respective side frames 63 by bolts 66. Each pair of triangularly-shaped plates 62 also includes a spacer bar 68 (FIG. 14) that helps maintain the desired spacing between the plates 62.

Two generally L-shaped drive plates 70 are also mounted on one end for rotation motion about the cylindrical bar 56, the two drive plates 70 being joined to one and other by a piece of elongated bar stock 72 so that they move in tandem about the cylindrical bar. The cylindrical bar 56 also supports nylon washers (not shown) between adjacent tensioning units 54 and drive plates 70. The second end of each drive plate 70 is pivotally connected to a piston rod 74 which is linearly moved by an associated cylinder 76, each cylinder 76 being pivotally mounted to the frame at 78. As will be described in greater detail below, the drive plates 70 are also operatively connected to the tensioning pulley units 54 so that tension can be applied to or released from the conveyor belts 15 through actuation of the cylinder 76/piston rod 74.

In accordance with this aspect of the invention, the four tensioning pulley units 54 are ganged together to provide for their movement in unison to tension the belts 15. However, each tensioning unit 54 includes a "lost motion" connector so that it is capable of a certain amount of tensioning movement independent from each of the other units 54. This accommodates for potential differences in the lengths of the several belts 15 comprising the conveyor system.

To this end, each of the mounting plates 62 in each tensioning unit is attached to the bar stock 72 that connects the two drive plates 70 to each other by a "lost motion" connection including a pair of springs 80. Each tensioning unit 54 has a short piece of bar stock 82 (best seen in FIG. 14) secured thereto for receiving one end of the springs 80, the other end of each pair of springs 80 being secured to the bar stock 72 that connects the two drive plates 70. Relative motion between each tensioning unit 54 and the drive plates 70 is limited by means of a transverse bar 84 mounted to the drive plates 70 that is captured in a slot 86 in the triangularly-shaped plates 62 of each tensioning unit 54.

Figure 12:
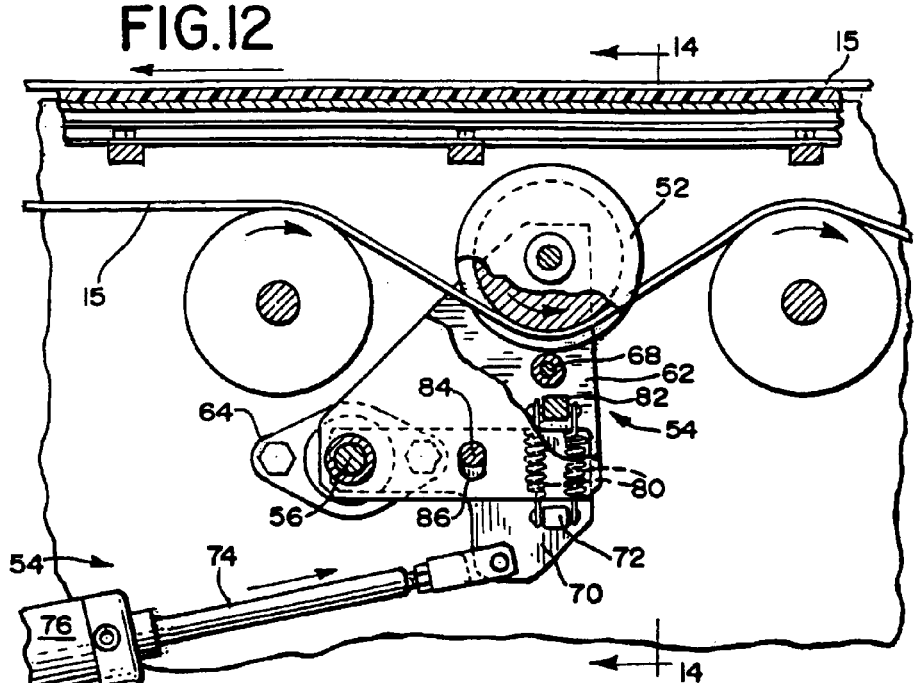
FIG. 12 is an enlarged side view similar to FIG. 11.
Figure 13:
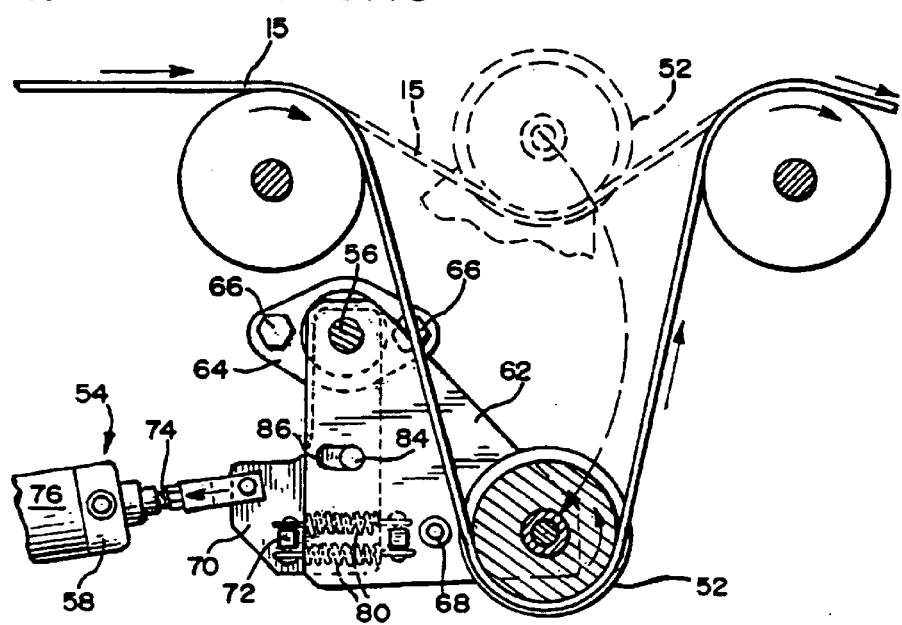
FIG. 13 is a schematic drawing showing the belt tensioner unit.
Figure 15:
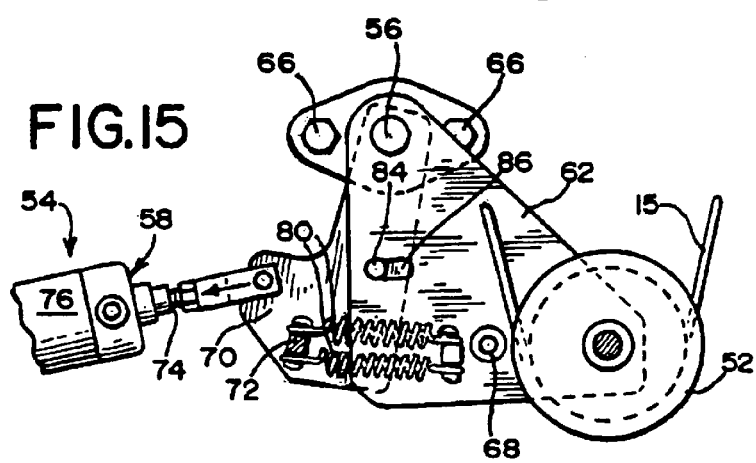
FIG. 15 is a side view of the belt tensioning unit.

Thus, with reference to FIGS. 12, 13 and 15, the operation of the belt tensioner will be described. In FIG. 12, the piston rods 74 are fully extended and each belt 15 is in its state of least tension. This is generally the state when the conveyor is not in operation. When the conveyor is activated, the piston rods 74 are then retracted into their respective cylinders 76 to rotate the tensioning pulleys 52 in a clockwise direction about the axis 56 (see FIG. 13), thus applying greater tension to the belts 15. The pistons 58 are actuated so that a constant force is applied to the tensioning pulleys 52. In practice, the cylinders 76 are pneumatically operated and each applies approximately 35 pounds of force to the tensioners 54. At the start of the tensioning, the force of the springs 80 is such that motion limiting bar 84 is in the front of the slot 86 (FIGS. 12 and 13). As the tensioning pulleys 52 are rotated clockwise, there may come a time when the force of the belt 15 on the any of the four tensioning pulleys 52 is greater than the spring force holding the limiting bar 84 in the front of the slot 86. Importantly, this point may not be the same for all of the belts 15 if they are of different length. Then, the drive plates 70 can continue to move clockwise against the force of the springs 80 until the limiting bar 84 hits the bottom of the slot 86 (see FIG. 15). When each spring 80 is fully stretched (as in FIG. 15), it exerts a force of approximately 60 lbs between the pulley assembly 54 and the transverse bar 32. The length of the slot 86 is generally sufficient to accommodate the tensioning of belts 15 of different lengths by allowing the independent movement of each belt tensioner 54 as limited by the travel of the bar 84 within the slot 86.

Thus, a narrow belt conveyor has been provided that meets all the objects of the present invention. While the invention has been described in terms of certain specific embodiments, there is no intent to limit the invention to the same. Instead, the invention is defined by the following claims.

What is claimed:

1. A belt tensioner for a conveyor comprising two or more endless belts, the belt tensioner comprising:

an axle member mounted to the conveyor transversely to the belts;

the first bracket assembly for each belt pivotally mounted to the axle member;

a tensioning pulley associated with each belt mounted for rotation with respect to its associated first bracket assembly;

a second bracket assembly pivotally mounted to the axle member;

an actuator connected to the second bracket assembly for pivoting the second bracket assembly about the axle member; and a lost motion connector connecting each first bracket assembly to the second bracket assembly, whereby, when said second bracket assembly is pivoted by the actuator about the axle member in a direction to apply tension to the belts, each bracket is tensioned individually to approximately the same tension.

2. The belt tensioner of claim 1 wherein the lost-motion connector that limits the amount of independent movement of each of the first bracket assemblies with respect to the second bracket assembly.

3. The belt tensioner of claim 2 wherein the lost-motion structure comprises a resilient member connecting each first bracket assembly to the second bracket assembly and a bar associated with the second bracket assembly, the bar being captured in a slot in each of the first bracket assemblies.

4. The belt tensioner of claim 1 wherein the actuator comprises a piston capable of applying between approximately 35 to 60 lbs. of force on the second bracket assembly.

* * * * *